United States Patent [19]

Shiihara

[11] Patent Number: 5,262,966

[45] Date of Patent: Nov. 16, 1993

[54] DATA ACQUISITION METHOD IN CENTRALIZED REMOTE-SUPERVISORY SYSTEM AND APPARATUS USED THEREFOR

[75] Inventor: Kenji Shiihara, Kawasaki, Japan

[73] Assignee: Fujitsu Limited, Kawasaki, Japan

[21] Appl. No.: 666,761

[22] Filed: Mar. 8, 1991

[30] Foreign Application Priority Data

Mar. 20, 1990 [JP] Japan .................................. 2-70784

[51] Int. Cl.⁵ ...................... G06F 15/46; G06F 15/20
[52] U.S. Cl. .................................. 364/551.01; 364/505
[58] Field of Search .............. 364/550, 551.01, 571.05, 364/132, 138, 505, 506; 236/46 R, DIG. 1; 340/825.06, 825.07

[56] References Cited

U.S. PATENT DOCUMENTS

| | | | |
|---|---|---|---|
| 4,057,785 | 11/1977 | Furniss et al. | 340/825.06 |
| 4,212,078 | 7/1980 | Games et al. | 395/325 |
| 4,382,287 | 5/1983 | Ackman et al. | 340/825.06 |
| 4,535,401 | 8/1985 | Penn | 364/138 |
| 4,602,343 | 7/1986 | Dougherty | 364/505 |
| 4,974,181 | 11/1990 | Sinderson et al. | 364/550 |

FOREIGN PATENT DOCUMENTS 58-70396  4/1983  Japan .

*Primary Examiner*—Thomas G. Black
*Assistant Examiner*—Michael Zanelli
*Attorney, Agent, or Firm*—Armstrong, Westerman, Hattori, McLeland & Naughton

[57] ABSTRACT

A centralized remote-supervisory system and a data acquisition method therefor, wherein the system includes a central processing unit and a plurality of terminal units connected to the central processing unit, each terminal unit including sensors. The central processing unit of the system provides a criterion value corresponding to each of a plurality of time zones, and transmitting the criterion value to the terminal unit, wherein the criterion value is utilized for forming a threshold level used in the terminal unit. The terminal unit of the system compares a differential between a current detected data and a previously detected and stored data with the threshold level, and selectively transmits the current detected data to the central processing unit and replaces the previously detected and stored data with the current detected data when the differential is larger than the threshold level.

18 Claims, 7 Drawing Sheets

DATA ACQUISITION METHOD IN CENTRALIZED REMOTE-SUPERVISORY SYSTEM AND APPARATUS USED THEREFOR

BACKGROUND OF THE INVENTION

1. Field of the Invention

The present invention relates to a centralized remote-supervisory system and a data acquisition method thereof, wherein the system comprises a central processing unit and a large number of terminal units, each terminal unit having a plurality of sensors. And more particularly, the present invention relates to an improved system and a method of efficient data collection in a centralized remote-supervisory system, wherein the system is expected to work under the different conditions such that detected data by the sensor shows a rapid change during a specific time zone and that detected data shows a comparatively slow change during a normal time zone other than the specific time zone. The system of the present invention is particularly useful for controlling environment in a building, operation of a dam-type electric power station, an electric power self-supporting system at power stoppage, etc.

2. Description of the Related Art

FIG. 1 shows a concept of a centralized remote-supervisory system. A central processing unit 1 comprises a data communication unit 1a connected with a bus line 3. The bus line 3 is further connected to a plurality of terminal units 2 which are located far distant away from the central processing unit 1. Thus the system of FIG. 1 constitutes the centralized remote-supervisory system.

Each terminal unit 2, for example, comprises a CPU 2a (processing unit in the terminal unit is abbreviated as CPU 2a) and a memory 2b, a timer 2c and an I/O (input-/output) interface unit 2d. A plurality of sensors 4 for detecting such as temperature, humidity, pressure, flow rate, etc. are connected to the I/O interface unit 2d. The detected data by the sensor 4 are periodically stored in the memory 2b under the control of the CPU 2a and the timer 2c.

In the prior art method utilizing the above system, the timer 2c gives periodically an interruption command to the CPU 2a. The CPU 2a when the interruption command is received, reads the stored data, and transmits the data to the central processing unit 1. The transmitted data from the terminal unit 2 are received at the central processing unit 1 and subjected to data processing such as an averaging process and the like, and finally utilized for controlling the associated equipments or machines with this system.

In the prior art method, the data are transmitted to the central processing unit 1 at regular periods, there is a problem that the load to the central processing unit 1 for data processing increases with an increase of the numbers of terminal units 2 and sensors 4. In order to cope with this problem, a memory area is further provided for storing a threshold level $\Delta Q$ in the memory 2b. The threshold level $\Delta Q$ is a predetermined constant and stored in advance in the terminal unit 2. The periodically detected data by the sensor 4 is once stored in the memory 2b and the next detected data Dc (current data) by the same sensor is compared with the previously detected and stored data Dp. If an absolute value $\Delta D$ of the differential ($=Dc-Dp$) between these two data is larger than the predetermined threshold level $\Delta Q$, the differential data $\Delta D$ is judged to be appreciable, and the data Dc is transmitted to the central processing unit 1.

FIG. 2 is a sequence flow chart of the above data collection method of the prior art. First, by an interruption command of the timer 2c, the detected current data Dc from the sensor 4 is once stored in the memory 2b (S1), and the data Dc is compared with the previously detected and stored data Dp and the differential ($=Dc-Dp$) is calculated (S2), and absolute value of the differential $\Delta D$ (hereinafter, the differential $\Delta D$ always represents an absolute value) is compared with the threshold level $\Delta Q$ stored in the memory 2b (S3).

If $\Delta D \geq \Delta Q$, the CPU 2a transmits the data Dc to the central processing unit 1 as the data showing an appreciable change (S4). Thereafter, the stored previous data Dp in the memory 2b is replaced with the new current data Dc (S5). If $\Delta D < \Delta Q$ in step S3, no data transmission to the central processing unit 1 is carried out because there is no appreciable change in data.

In the prior art method disclosed using the flow chart of FIG. 2, there still remains a problem. In case of an air conditioning system for temperature control in a building, for example, when the air conditioner is switched on at 8 o'clock in the morning, room temperature to be monitored in the building changes rapidly as shown in FIG. 3. In such case as this, if the prior art method is applied in time zone $TZ_a$, the chances that the differential $\Delta D$ exceeds $\Delta Q$ are so often that the data are to be transmitted from the terminal unit 2 to the central processing unit 1 each time of data acquisition. As the result, the central processing unit 1 is subjected to a rush of data and causes an inconvenience of delay in data processing. The similar problem is experienced at the time when the air conditioner is switched off at 6 p.m.

In FIG. 3, it is assumed schematically that the room temperature is to be controlled at 20° C. and the threshold level $\Delta Q$ ($=\Delta \tau$) for the room temperature is set at 1° C. (in an actual application, $\Delta \tau$ is set at smaller value), room temperature data are transmitted from the terminal unit 2 to the central processing unit 1 six times, i.e., at times $t_1, t_2, \ldots, t_6$, during the time zone $TZ_a$. There are a large number of terminal units located in other rooms, each of which transmits data in the similar way, therefore, the central processing unit is subjected to a concentrated data rush to transact with during the time zone $TZ_a$. Data communication state between the terminal unit 2 and the central processing unit 1 is schematically shown in FIG. 4. In FIG. 4, the vertical downward direction shows time progress, and inclined arrows (inclination of the arrow does not include any special meaning) from left to right show that the data is transmitted to the central processing unit 1 at each time when the detected data shows a room temperature rise satisfying the condition of $\Delta D \geq 1°$ C. When the room temperature rises at 20° C., the air conditioner is controlled to reduce its function.

SUMMARY OF THE INVENTION

The object of the present invention is to solve the above problems and provide a centralized remote-supervisory system and a method of data acquisition without a rush of data to the central processing unit during the specified time zone, in which a rapid change of detected data is expected.

Another object of the present invention is to provide the centralized remote-supervisory system and the method of data acquisition, wherein even a small change of detected data can be acquired during normal time zones except the above specified time zone.

These objects are achieved by a centralized remote-supervisory system and a data acquisition method of the present invention. The centralized remote-supervisory system of the present invention comprises a central processing unit and a plurality of terminal units connected to the central processing unit, each terminal unit comprising at least a sensor. The function thereof are as follows.

The central processing unit comprises a memory unit for storing a plurality of time zone data and a plurality of criterion values corresponding to each of the time zones in a memory unit of the central processing unit, and transmits the criterion value from the central processing unit to the terminal unit each time when the system enters into the time zone.

The terminal unit calculates periodically a differential between the current detected data by the sensor and the previously detected data in a memory unit thereof, and checks whether the differential is larger than a threshold level or not, the threshold level being obtained by processing the criterion value transmitted from the central processing unit, and transmits the current data from the terminal unit to the central processing unit only when the differential is larger than the threshold level, and then replaces the stored data with the current data.

BRIEF DESCRIPTION OF THE DRAWINGS

Throughout the drawings, the same or similar reference numerals designate and identify the same or similar parts.

DETAILED DESCRIPTION OF THE PREFERRED EMBODIMENTS

Details of the preferred embodiment of the present invention are explained referring to figures.

Figure 1:
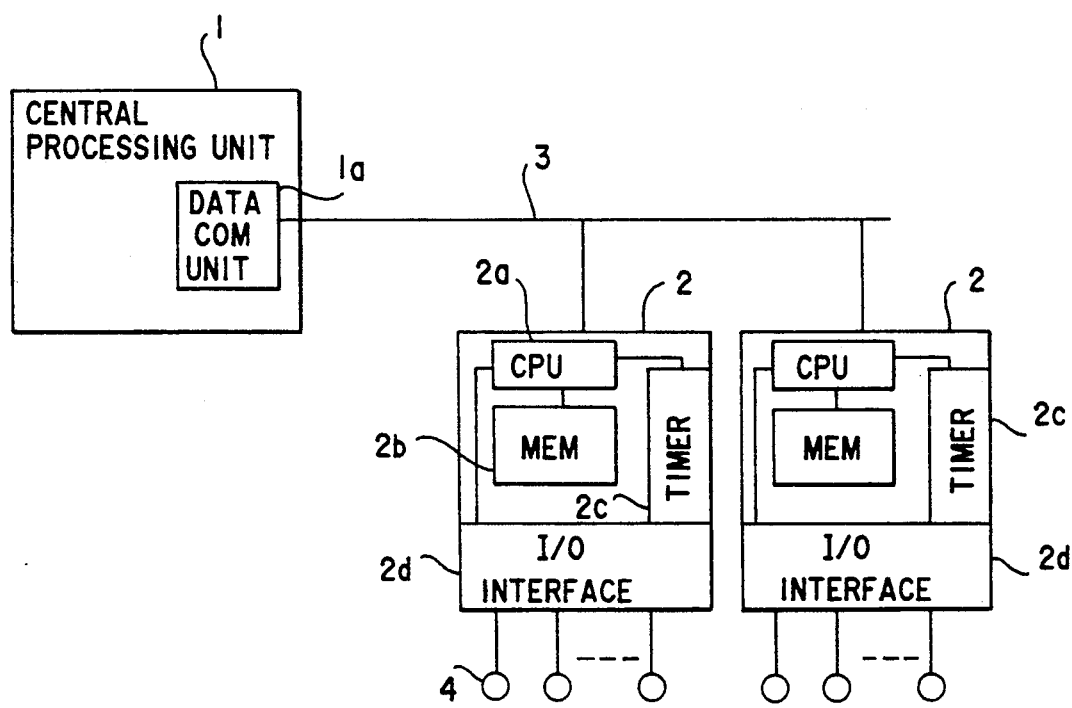
FIG. 1 shows a general concept of a remote supervisory system.
Figure 2:
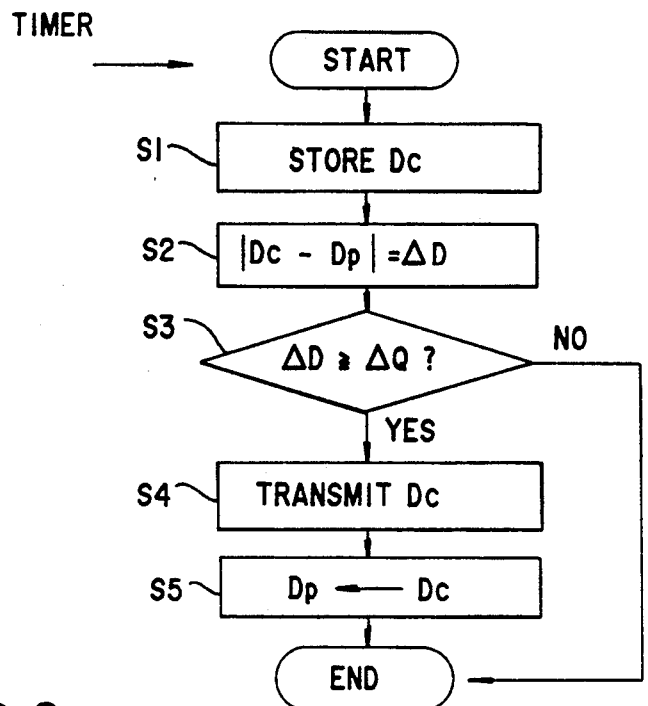
FIG. 2 is a sequence flow chart for a data acquisition system of the prior art.
Figure 5:
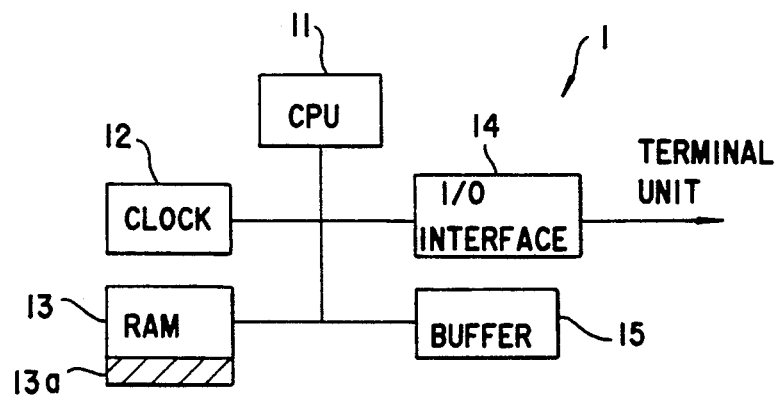
FIG. 5 is a block diagram of an embodied central processing unit of the present invention.
Figure 6:
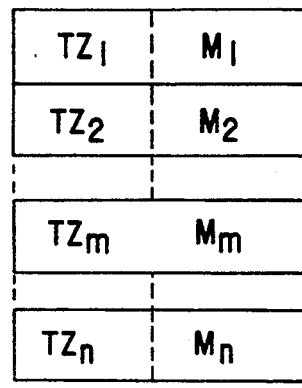
FIG. 6 shows schematically a storage state in a memory unit of a central processing unit of the present invention.

The basic structure of a centralized remote-supervisory system is the same as that shown in FIG. 1. FIG. 5 is a block diagram of the embodied central processing unit in the centralized remote-supervisory system of the present invention. A CPU 11 (processing unit in the central processing unit 1 is abbreviated as CPU 11) controls the entire operation of the centralized remote-supervisory system. A clock 12 outputs time information, and a memory unit 13 of RAM stores necessary data. Reference numeral 14 denotes an I/O (input/output) interface unit connected to the terminal unit 2, and 15 denotes a buffer. In FIG. 6, a memory area 13a in the memory unit 13 stores a plurality of time zone data $TZ_1$, $TZ_2$, ..., $TZ_m$, ..., $TZ_n$, and a plurality of criterion value data $M_1$, $M_2$, ..., $M_m$, ..., $M_n$ corresponding to each of the time zones.

The CPU 11 is always watching the time information from the clock 12 and, when the time enters in a time zone $TZ_m$, the criterion value $M_m$ corresponding to the time zone $TZ_m$ stored in the memory area 13a is transmitted to the terminal unit through the I/O interface unit 14. The meaning of the criterion value $M_m$ will be explained later.

Figure 7:
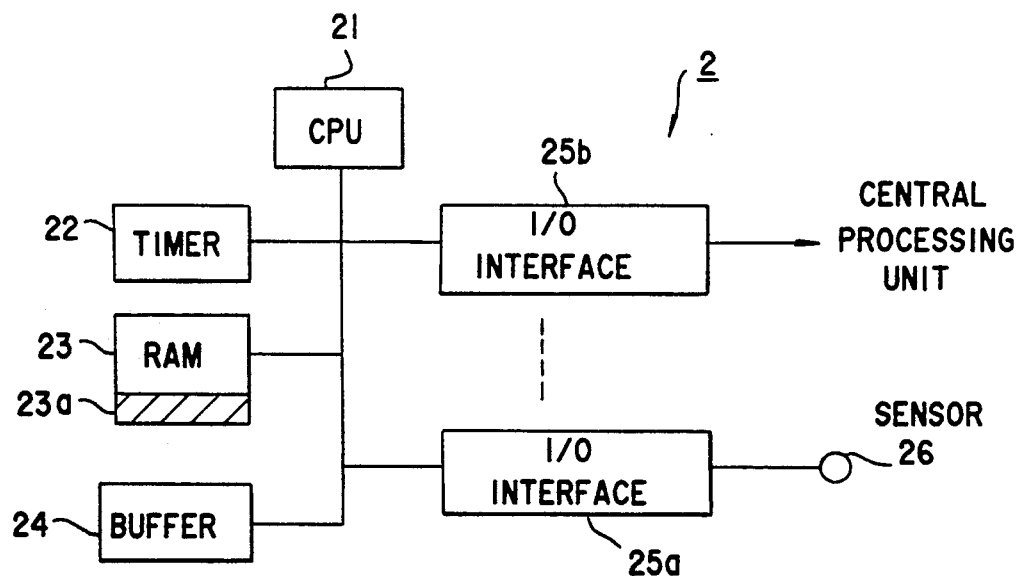
FIG. 7 is a block diagram of an embodied terminal unit of the present invention.
Figure 8:
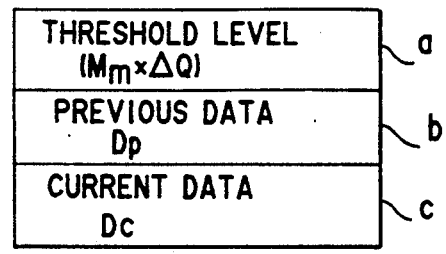
FIG. 8 shows schematically a storage state in a memory unit of a terminal unit of the present invention.

FIG. 7 is a block diagram of the embodied terminal unit of the present invention. A CPU 21 controls the entire operation of the terminal unit 2, a timer 22 outputs time information, and a memory unit 23 of RAM temporary stores data. As shown in FIG. 8, a memory area 23a in the memory unit 23 includes a memory area c for storing the current detected data Dc from a sensor 26 through an I/O interface 25a, a memory area b for storing the previously detected data Dp, and a memory area a for storing a threshold level TH, which is either the same as the criterion value $M_m$ transmitted from the central processing unit 1, or a processed data $M_m \times \Delta Q$ (explained later) using the criterion value. A plurality of sensors 26 are connected to the I/O interface 25a, which include sensors for sensing temperature, pressure, flow rate, etc. Though it is not shown in FIG. 7, the sensor 26 is sometimes connected to the I/O interface 25a via a transducer. There is another I/O interface 25b, which is connected to a bus line and further to the central processing unit 1 and transmits data thereto. Further the terminal unit 2 comprises a buffer 24.

With regard to the criterion value data $M_1$, $M_2$, ..., $M_m$, ..., $M_n$ which are explained in FIG. 6, they may be expressed either in an actual unit of such as temperature, humidity, flow rate, etc., or simply in a numerical constant without dimension. For room temperature control, for example, the criterion value data may be such as 2° C., 1° C., 0.5° C., etc. or they may be constants such as 2, 1, 0.3, etc. When the latter expression is selected, a basic threshold level $\Delta Q$ is separately provided and stored in the terminal unit in advance which is constant throughout the data acquisition procedure, the threshold level TH ($=M_m \times \Delta Q$) is obtained by multiplying the criterion value $M_m$ by the basic threshold level $\Delta Q$. In the prior art, a constant threshold level $\Delta Q$ is used for the entire data acquisition procedure.

When the output from each sensor 26 is an analog data output, the I/O interface 25a converts the output to a digital data utilizing an A/D converter (not shown), thereafter, the data is stored in the memory area c. In the memory unit 23, the necessary number of memory areas are provided corresponding to the number of sensors 26.

In the structure as disclosed in FIGS. 7 and 8, the CPU 21 reads the current data Dc stored in the memory area c and the previously detected and stored data Dp in the memory area b periodically in accordance with a command of the timer 22. And the CPU 21 calculates the differential $\Delta D$ ($=Dc-Dp$) between the previously detected data Dp and the measured current data Dc. Next, the differential $\Delta D$ is compared with the threshold level TH stored in the memory area a. Herein, the threshold level TH is either the criterion value $M_m$ or $M_m \times \Delta Q$ explained previously. In case that the differential $\Delta D$ is greater than TH ($M_m$ or $M_m \times \Delta Q$), the CPU 21 judges that there has been a change in data, and transmits the current data Dc to the central processing unit through the I/O interface 25b. The differential value may be positive value or negative value, and its absolute value is compared with the threshold level. In case of sensing room temperature, for example, either rise or fall of the temperature, i.e., the direction of data change is also transmitted to the central processing unit 1.

Figure 3:
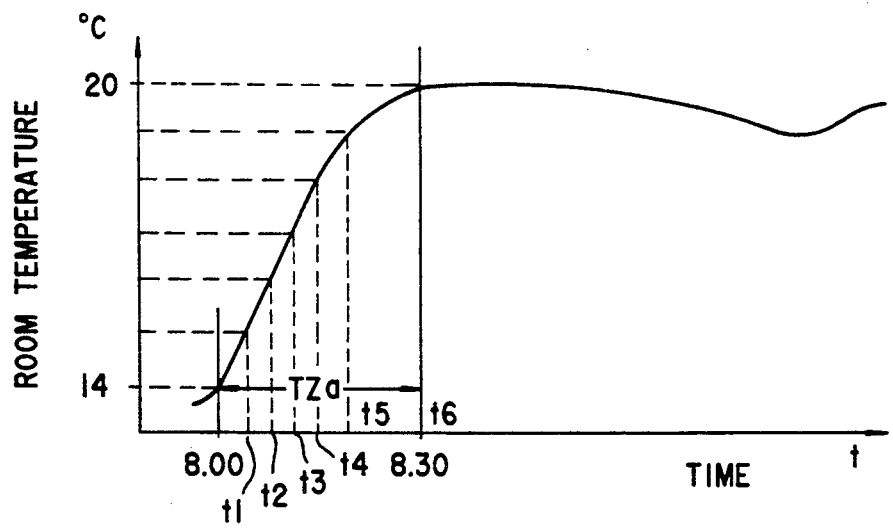
FIG. 3 shows temperature change in a building and data transmission from a terminal unit of the prior art.

In case that the differential $\Delta D$ is smaller than $M_m \times \Delta Q$, the CPU 21 judges that there has been no change, and does not transmit the data to the central processing unit. In this way, frequent loading to the central processing unit 1 of the prior art such as experienced during the time zone $TZ_a$ of FIG. 3 can be avoided.

Figure 4:
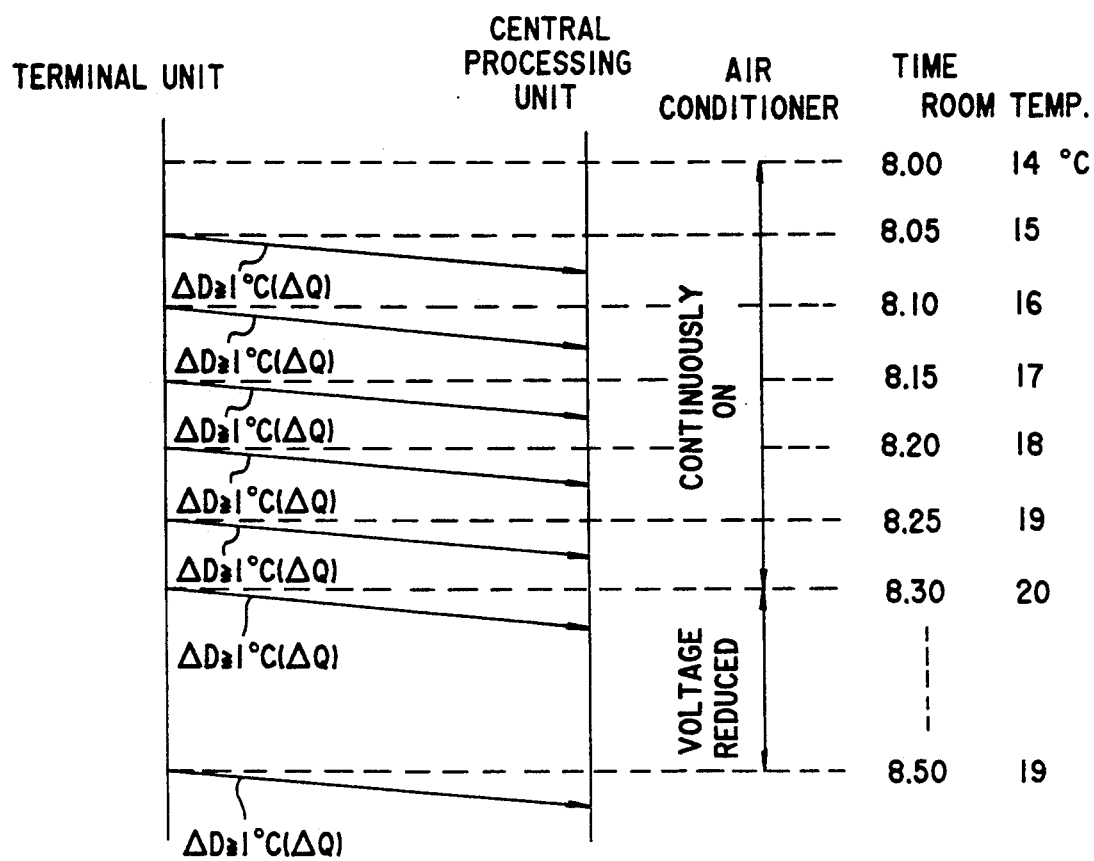
FIG. 4 shows schematically data transmission from a terminal unit to a central processing unit of the prior art.
Figure 9:
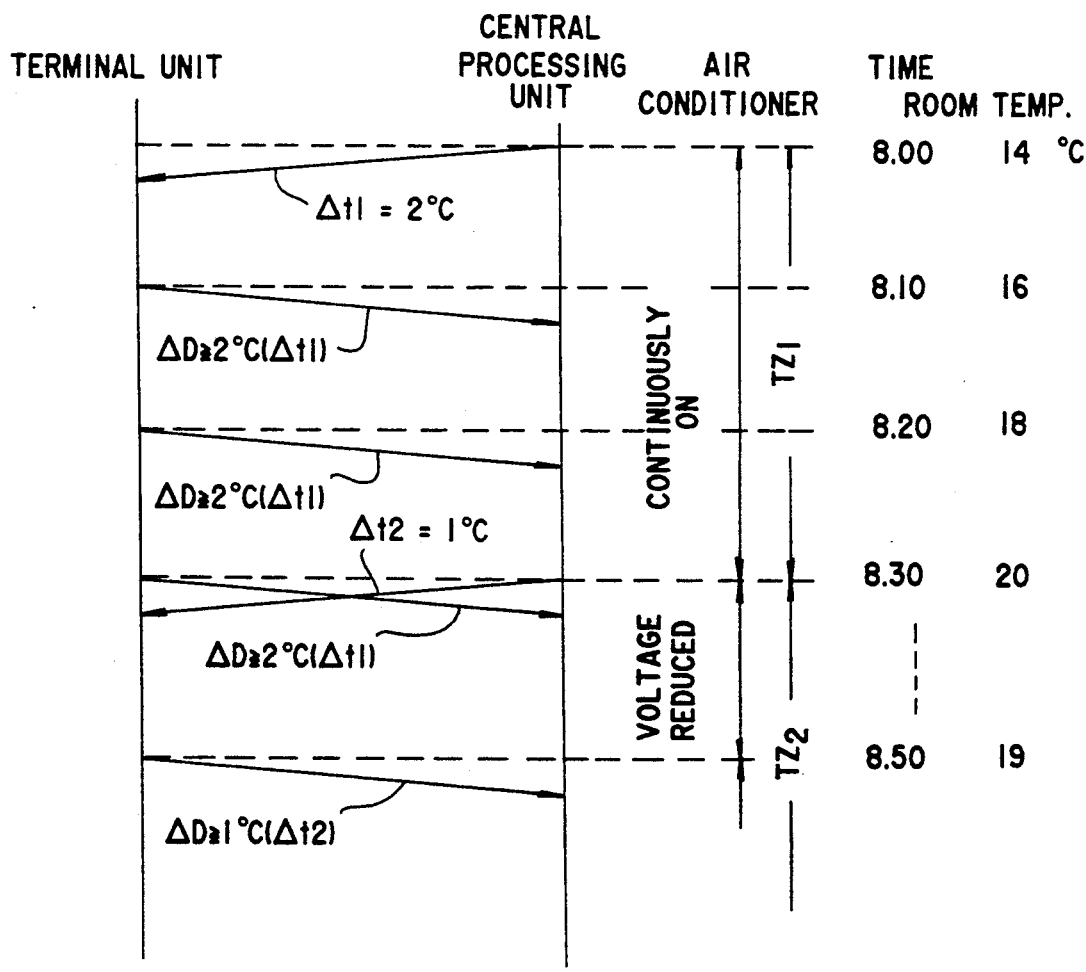
FIG. 9 shows schematically data transmission from a terminal unit to a central processing unit of the present invention.

Data communication state between the terminal unit 2 and the central processing unit 1 in accordance with the above embodiment is more clearly illustrated in FIG. 9, which is the similar figure as FIG. 4. In FIG. 9, it is assumed that the memory area 13a in the central processing unit 1 stores a group of the paired data, i.e., time zone and criterion value such as $TZ_1$ (8.00 to 8.30 a.m.) and $\Delta \tau$ of 2° C., and $TZ_2$(after 8.30 a.m.) and $\Delta \tau$ of 1° C., the data communication state is much simplified compared with that shown in FIG. 4.

Figure 10A:
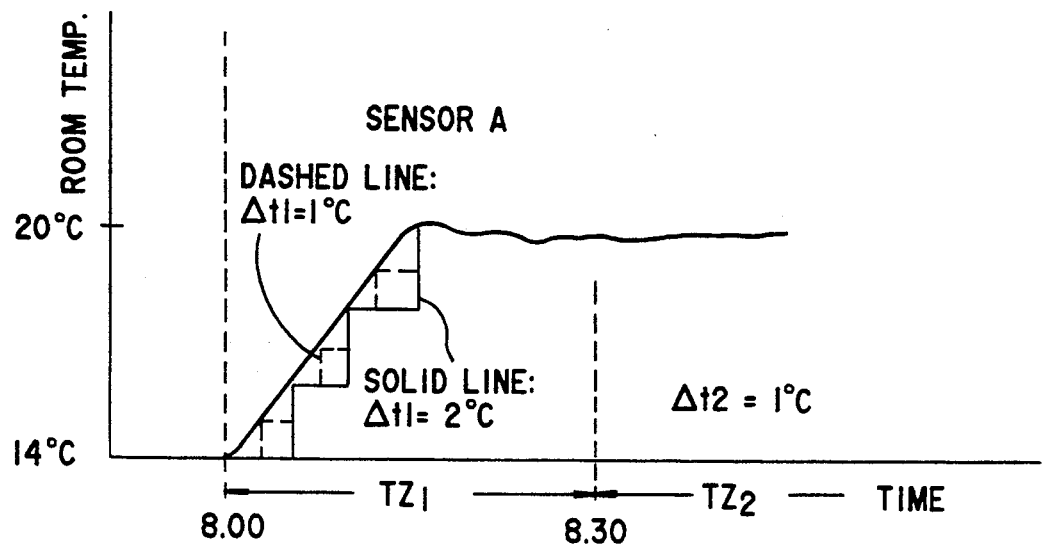
FIGS. 10(a) and 10(b) show a room temperature change in two separated rooms respectively.
Figure 10B:
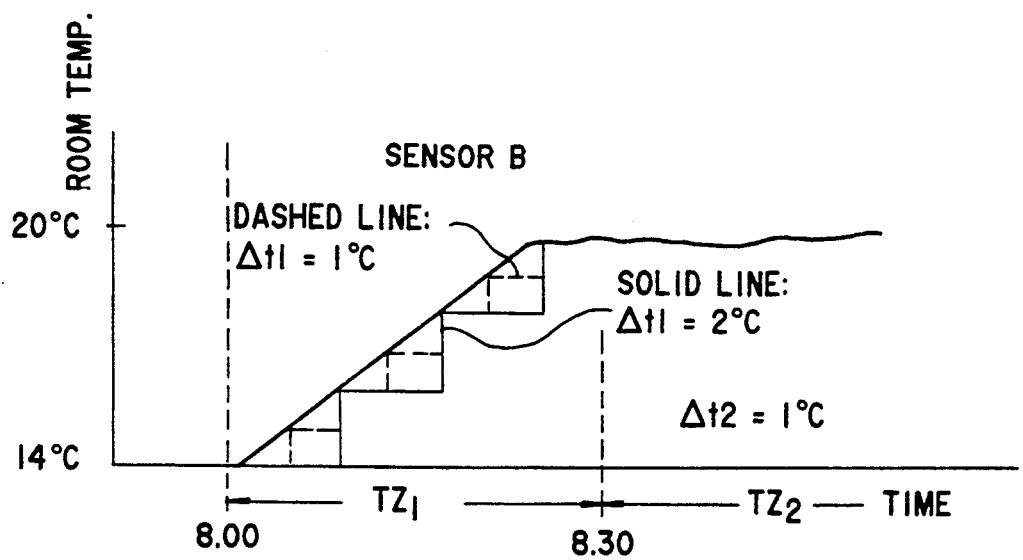
Figure 10C:
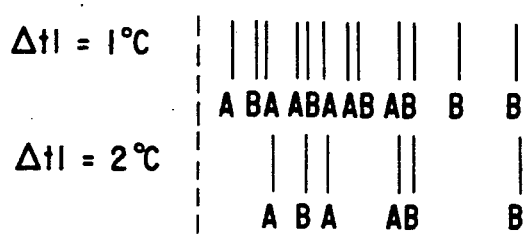
FIG. 10(c) shows schematically number of times when data transmission occurs, in which the embodiment of the present invention (lower part) is compared with the prior art method (upper part)

Data communication state of the above embodiment is explained in another way. In FIGS. 10(a) and 10(b), curves show a temperature change detected by two sensors A and B respectively located in different rooms and the vertical lines of stepped lines show the times when data is transmitted to common central processing unit 1. If the constant threshold level of 1° C. is used throughout the entire data acquisition procedure in the same way of the prior art, each of two sensors A and B transmits data six times (three vertical dashed lines and three solid lines) respectively (total 12 times) to the central processing unit 1. The times when data communication occurs is illustrated schematically in an upper portion of FIG. 10(c). On the contrary, when the criterion value data $\Delta \tau = 2°$ C. is used for the time zone $TZ_1$, the number of times of data communication is reduced to three times each sensor as shown by vertical solid lines, and it is shown in a lower portion of FIG. 10(c).

Generally speaking, for the time zone during which a rapid change of detected data is foreseen, the criterion value is selected larger than that for the other normal time zones. A ratio of magnification may be between 2 and 5 and it depends on what the sensor detects. In FIGS. 10(a) and 10(b), for example, $\Delta \tau$ for the time zone $TZ_1$ is selected to be 2° C., which is twice the value of 1° C. for $TZ_2$.

Another example is explained, which conforms with an actual application for controlling temperature and humidity in a building. It is assumed that the building has 100 rooms, each having a terminal unit with sensors for temperature and humidity and that air conditioner starts at 8.00 a.m. and the temperature is expected to rise from 15° C. to 20° C. and the humidity from 50% to 60% at 8.30 a.m. In a normal operating condition after 8.30 a.m., the temperature and humidity are to be controlled with the threshold levels of 0.1° C. and 1% respectively. However, in accordance with the present invention, the threshold levels are set to be 0.5° C. and 2% during the time zone $TZ_1$ for 8.00 to 8.30. The number of data transmissions from 100 terminal units to a central processing unit is given as follows.

$$\{(20-15)/0.5\} \times 100 + \{(60-50)/2\} \times 100 = 1,500$$

On the contrary, if the threshold levels of 0.1° C. and 1% are used as in the prior art method, the number of data transmission is given as follows.

$$\{(20-15)/0.1\} \times 100 + \{(60-50)/1\} \times 100 = 6,000$$

As clearly seen from the above comparison, the number of data transmissions in accordance with the present invention is reduced to ¼ of that by the prior art method.

Figure 11A:
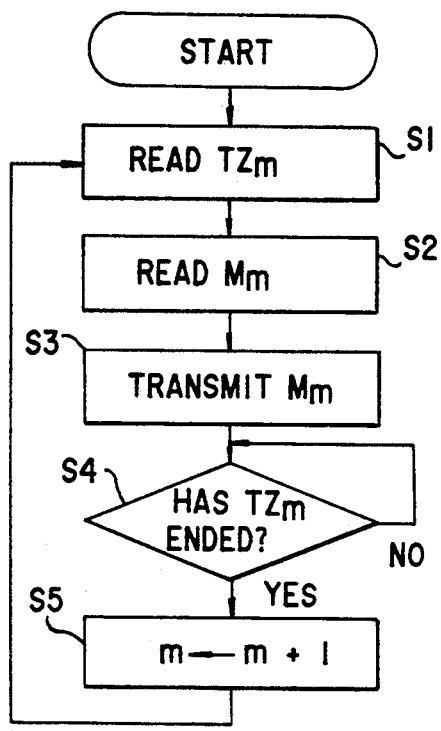
FIGS. 11(a) to 11(c) are flow charts of an embodiment of the present invention.
Figure 11B:
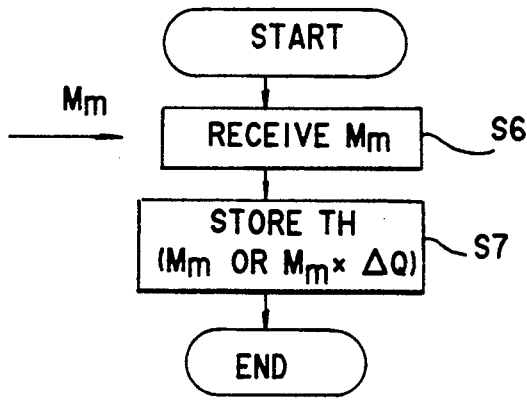
Figure 11C:
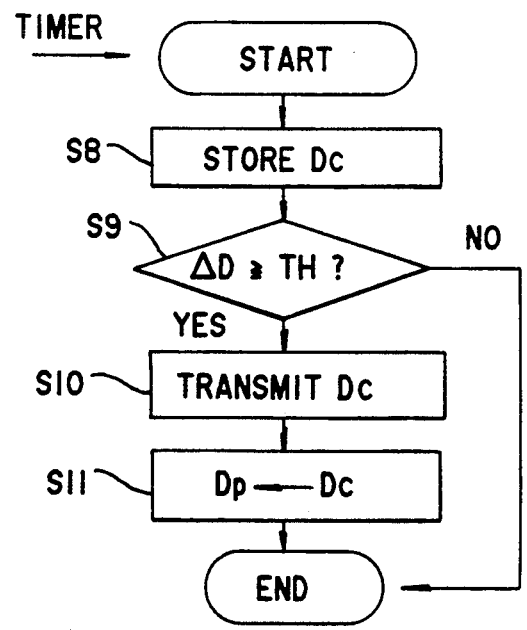

FIGS. 11(a) to 11(c) are flow charts of the embodiment of the present invention. FIG. 11(a) is a flow chart of the operation of the central processing unit when the system is entering in the time zone $TZ_m$. FIG. 11(b) is a flow chart of the operation of the terminal unit for receiving the criterion value data $M_m$ from the central processing unit, and FIG. 11(c) is a flow chart of data collection (Dc) and data transmission to the central processing unit. In the central processing unit of FIG. 11(a), the CPU 11 (refer to FIG. 5) is always checking the time information sent from the clock 12 and first reads time zone $TZ_m$ (S1) and then reads the criterion value $M_m$ stored in the memory area 13a (S2). The criterion value $M_m$ is transmitted to the terminal unit (S3). Next, the CPU is always checking whether the present time is within the time zone $TZ_m$ (S4), and when the $TZ_m$ has ended, the subscripts m of time zone TZ and criterion value M are rewritten as the next numeral m+1 (S5), and the CPU reads the next time zone $TZ_{m+1}$.

In the terminal unit, when the criterion value $M_m$ is received (S6), the CPU 21 (refer to FIG. 7) stores the threshold level TH (either $M_m$ or $M_m \times \Delta Q$) in the memory area a in the memory unit 23 (S7). This new threshold level TH is stored at a predetermined address of the memory unit 23.

Further in the terminal unit, the analog data is output from the sensor 26. The output from the sensor 26 (refer to FIG. 7) is sent to the CPU 21 through the I/O interface 25a and stored in the memory area c in the memory unit 23 (S8). Next, the CPU 21 calculates the differential $\Delta D$ between the measured current data Dc and the previously detected data Dp, and it is compared with the threshold level TH (S9). Herein, in case of $\Delta D < TH$, the CPU 21 does not transmit data Dc to the central processing unit because of a small change in data. In case of $\Delta D \geq TH$, it is judged there is an appreciable change in data, and the data Dc is transmitted to the central processing unit (S10), and further the previously detected data Dp is replaced with the new current data Dc (S11). In this way, these steps are repeated for the other time zone TZ. According to the embodiment, the current data Dc is transmitted to the central processing unit only when the differential $\Delta D$ between the current detected data Dc and the replaced previous data Dp is greater than TH. Therefore, the number of data transmission to the central processing unit is reduced during the busy time zone such as $TZ_a$, and the load to the central processing unit is reduced.

According to the present invention, as explained above, in the time zone in which the current detected data shows a rapid change, the threshold TH is made larger, which results in reducing the number of data transmission and alleviating load to the central processing unit. Therefore, the effects in practical applications are very fruitful.

In the above embodiments, the system for controlling room temperature, humidity, etc. in a building is used as one example of applications of the present invention. There are many other applications of the present invention. In a dam-type electric power station, there are many control items such as control of open and close operation of water gate, start, running and stop control of water-wheel and power generator, on-off control of power transmission line, etc. For example, when a rapid change of water level is expected during a heavy rainfall, the threshold level for a water level sensor is made large with the result of reducing data transmission frequency to a central processing unit.

Other than atmosphere conditions such as temperature, humidity, carbon dioxide ($CO_2$) content in a building, there are many factors which need control. Illumination equipments or aqueduct equipments in a large building are generally controlled in a remote supervisory system. When an electricity supply stoppage occurs, data transmission from the terminal units are forcibly cut off by detecting power stoppage. When power supply is restored, a data rush from terminal units will continue for some time, therefore, it is very effective to change threshold levels for many sensing items larger in accordance with the present invention.

The present invention may be used still further in other specific forms without departing from the spirit or essential characteristic thereof. The presently disclosed embodiments are therefore to be considered in all respects as illustrative and not restrictive, the scope of the invention being indicated by the appended claims, rather than the foregoing description, and all changes which come within the meaning and range of equivalence of the claims are, therefore, to be embraced therein.

What is claimed is:

1. A centralized remote-supervisory system comprising a central processing unit, a plurality of terminal units connected to the central processing unit, and at least a sensor connected to each of the terminal units,
   wherein said central processing unit comprises means for providing a criterion value corresponding to each of a plurality of time zones and means for transmitting said criterion value to each of said terminal units; and
   wherein each of said terminal units comprises means for selecting the data detected by said sensor using said criterion value, and means for transmitting said selected data to said central processing unit based on said criterion value corresponding to each of said plurality of time zones.

2. A centralized remote-supervisory system as recited in claim 1, wherein said means for selecting the detected data further comprises means for obtaining a differential between a current detected data and a previously detected data and means for comparing the differential with a threshold level which is obtained by calculation using said criterion value.

3. A centralized remote-supervisory system as recited in claim 2, wherein said detected data is transmitted to the central processing unit when said differential is larger than said threshold level.

4. A centralized remote-supervisory system as recited in claim 2, wherein said selection of the detected data is done at regular intervals.

5. A centralized remote-supervisory system as recited in claim 2, wherein said transmission of the detected data is done at regular intervals.

6. A centralized remote-supervisory system as recited in claim 2, wherein said threshold level is the same as said criterion value transmitted from the central processing unit corresponding to each of said time zones.

7. A centralized remote-supervisory system as recited in claim 2, wherein said criterion value is a multiplication factor and said threshold level is obtained by multiplying a predetermined quantity by said criterion value.

8. A centralized remote-supervisory system as recited in claim 1, wherein said system comprises sensors for controlling building facilities including any one selected among an air-conditioner, an illumination equipment and an aqueduct equipment.

9. A centralized remote-supervisory system as recited in claim 8, wherein said system comprises a sensor for detecting temperature for an air-conditioning equipment.

10. A centralized remote-supervisory system as recited in claim 1, wherein said system comprises a sensor for detecting a water level in a dam facility.

11. A centralized remote-supervisory system as recited in claim 10, wherein said sensor detects water storage capacity in a dam power station.

12. A centralized remote-supervisory system comprising a central processing unit, a plurality of terminal units connected to the central processing unit, and at least a sensor connected to each of the terminal units,
    wherein said central processing unit comprises means for storing a time zone in which delay in data processing is anticipated, and means for transmitting a criterion value to each of said terminal units when the system enters into said time zone, the criterion value being set up for said time zone; and
    wherein each of said terminal units comprises means for storing a current detected data and a previously detected data by said sensor, and means for obtaining a differential between said current and previously detected data, and means for comparing whether said differential is larger than a threshold level obtained using said criterion value corresponding to each of said plurality of time zones, and means for transmitting said current detected data to the central processing unit when said differential is larger than the threshold level, and means for replacing said stored previously detected data with the current detected data when the current detected data is transmitted to the central processing unit.

13. A centralized remote-supervisory system as recited in claim 12, wherein said threshold level is the same as said criterion value transmitted from the central processing unit corresponding to said time zones.

14. A centralized remote-supervisory system as recited in claim 12, wherein said criterion value is a multiplication factor and said threshold level is obtained by multiplying a predetermined quantity by said criterion value.

15. A data acquisition method in a centralized remote-supervisory system, wherein said system comprises a central processing unit and a plurality of terminal units connected to the central processing unit, each terminal unit comprising at least a sensor, said method comprising the steps of:

(a) storing a plurality of time zone data and a plurality of criterion values corresponding to each of said time zones in the central processing unit;

(b) transmitting said criterion value from the central processing unit to each terminal unit each time when the system enters into said time zone;

(c) storing a current detected data and a previously detected data by said sensor;

(d) calculating a differential between said current and previously detected data;

(e) comparing said differential with a threshold level, the threshold level being obtained by calculation using said criterion value corresponding to each of said plurality of time zones; and (f) transmitting said current detected data to the central processing unit only when said differential is larger than said threshold level, and replacing said stored previously detected data with said current detected data when said current detected data is transmitted to the central processing unit.

16. A data acquisition method as recited in claim 15, wherein said criterion value in step (a) is the same as said threshold level in step (d), and no calculation is necessary for obtaining the threshold level in step (d).

17. A data acquisition method as recited in claim 15, wherein said threshold level is obtained by multiplying a predetermined quantity by said criterion value.

18. A data acquisition method as recited in claim 15, wherein said criterion value set up for the time zone in which data detected by the sensor shows a rapid change is selected to be larger than those for other time zones.

* * * * *